METHOD FOR FABRICATING MEMORY APPARATUS

Original Filed Sept. 10, 1962

INVENTOR
MARVIN R. ROOT
BY [signature]
ATTORNEY

3,457,634
METHOD FOR FABRICATING MEMORY APPARATUS

Marvin R. Root, St. Paul, Minn., assignor to Sperry Rand Corporation, New York, N.Y., a corporation of Delaware Original application Sept. 10, 1962, Ser. No. 222,343, now abandoned. Divided and this application Mar. 29, 1966, Ser. No. 544,649
Int. Cl. H01f 7/06; C23b 7/00
U.S. Cl. 29—604 6 Claims

ABSTRACT OF THE DISCLOSURE

A method of making a magnetic memory apparatus including forming a substrate member upon the surface of a base member, separating the substrate member from the base member to expose a replicated surface of the base member on the substrate member, depositing a thin magnetic film upon the replicated surface of the substrate member, and disposing electrical conductor transmission lines in proximity to the thin magnetic film.

This is a division of application Ser. No. 222,343, filed Sept. 10, 1962, and now abandoned.

CROSS REFERENCE TO RELATED APPLICATION

The invention herein described was made in the course of or under a contract or subcontract thereunder with the Department of the Navy, and is a divisional application of parent application, Ser. No. 222,343, filed Sept. 10, 1962, and now abandoned.

In the preparation of thin magnetic films, particularly nickel-iron ferromagnetic films that are intended to be utilized as binary information storage elements in data processing equipment, the individual films are normally deposited in an array pattern, the individual array including generally a plurality of word lines and a plurality of bit lines. In order to achieve uniformity of operation along with minimum dissipation of energy, it is essential that each of the individual arrays exhibit a high degree of uniformity, one to another. In order to achieve control of the magnetic condition of a film in any given time and in order to accomplish this with a minimum dissipation of energy, it is generally essential that the drive current loop be disposed as closely as possible to the film being controlled. This is desirable in order to improve the coupling of the flux to the film. In this fashion it is also possible to achieve a greater magnitude of output for given drive fields. In order to achieve these objectives, a relatively thin electrically conductive metallic substrate layer is indicated. However, in attempting to utilize a metallic substrate layer, difficulties are encountered in that the crystalline nature of metallic material, such as copper or the like, either severely encumber or prevent the preparation of surfaces which have the required degree of smoothness. In addition, problems are encountered in preparing flat, uniformly planar surfaces on a metallic substrate layer, such as copper or the like, due to the speed at which an oxide layer forms on the substrate. Because of these disadvantages, it becomes difficult to prepare reasonable magnetic thin films on a surface of conventionally prepared and polished metallic substrate surfaces. The alternative is, therefore, to use a substantially amorphous or super-cooled liquid surface such as is found on an ordinary glass member or the like. The mechanical nature of these amorphous materials such as glass, for example, is generally such that a substantial transverse thickness is required for handling and the like. It has been found that the mass of the substrate material and the transverse thickness thereof interferes with ordinary flux coupling of the films to the drive currents, sense lines, and the like. The active ferromagnetic film elements are therefore necessarily dsiposed at a point that is too remote from the transmission lines including the drive lines, sense lines and the like to provide for optimum operation.

In accordance with the present invention, the combined advantages of having a surface with the uniformity of a glass or amorphous substrate surface, the advantages of having the magnetic film disposed closely adjacent the substrate, together with the advantages of having a metallic electrically conductive substrate surface are all achieved. The technique of the present invention includes the preparation of a metallic substrate member along and in contact with the surface of a glass body, the specific surface of the substrate to be ultimately utilized in contact with the ferromagnetic film being the glass replicated surface of a metallic member which has been initially prepared in intimate contact with the surface of an amorphous or glass body.

Briefly, according to the present invention, a metallic substrate member is deposited and prepared along the surface of a highly polished glass body, and in intimate contact therewith. The preparation of a substrate layer is such that the metallic layer becomes bonded to the polished glass surface and the uniform smooth surface of the glass substrate is accordingly replicated along the mating surface of the metallic substrate layer. When a sufficiently thick substrate layer has been prepared over the initially deposited film, the layer is removed from the glass, and the glass replicated metallic surface is then prepared for deposition of a ferromagnetic film thereon. A ferromagnetic material such as Permalloy having a composition ranging from between about 79% and 82% of nickel, balance iron, is then either electrolytically or evaporatively deposited onto the substrate along the appropriate glass replicated surface thereof. Other ferromagnetic materials may be utilized, if desired, such as appropriately selected elements from the magnetic group including iron, nickel, and cobalt. Accordingly, the surface characteristics of the substrate include substantially all of the advantageous features of a polished glass surface, these advantages being obtained without the attending disadvantages of a relatively bulky glass or non-metallic substrate member. In addition, the advantages of a relatively thin metallic substrate layer are likewise achieved.

It is therefore an object of the present invention to prepare improved ferromagnetic films utilizing a metallic substrate having a glass replicated surface for deposition of ferromagnetic films thereon.

It is further an object of the present invention to provied an improved technique for preparing metallic substrates for use in connection with ferromagnetic films, the metallic substrate being electrically conductive and having a glass replicated contacting surface.

It is yet a further object of the present invention to provide an improved technique for preparing metallic substrate members having non-ferromagnetic characteristics, the substrate being prepared through the initial deposition of a film of metallic material such as copper or the like on the surface of a highly polished glass surface, this being followed by the building up of a heavier layer to form a substrate body, the substrate then being peeled from the glass, with the glass replicated surface ultimately being utilized as a surface for receiving an electrolytic or evaporative deposition of a ferromagnetic film thereon.

Other and further objects of the present invention will become apparent to those skilled in the art upon a study of the following specification, appended claims, and accompanying drawings, wherein:

Figure 3:
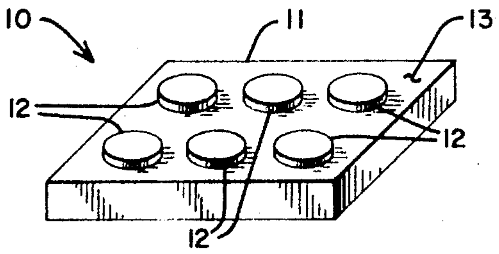
FIG. 3 is a perspective view of a completed ferromagnetic film array, a plurality of films being deposited upon a substrate surface, the various drive lines, sense lines, and the like being removed.
Figure 4:
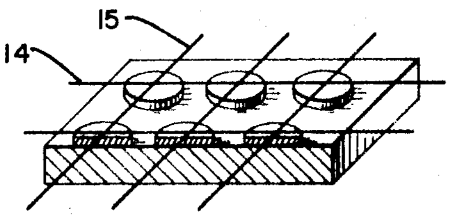
FIG. 4 is a perspective view, partially on section, showing the typical relationship of various electrical transmission lines to the individual films.

In the preferred embodiment of the present invention, attention is directed to FIG. 3 wherein there is illustrated a magnetic film memory array generally designated 10 that includes a substrate member 11 and a plurality of individual ferromagnetic film memory elements 12 disposed along the glass replicated surface 13 of the substrate member 11. The individual ferromagnetic memory elements are prepared in accordance with technique well known and established in the art such as, for example, by means of evaporative deposition techniques. A particular evaporative deposition technique which may be utilized is disclosed in the patent to S. M. Rubens, No. 2,900,282 dated Aug. 18, 1959, this particular technique being preferred for use in connection with the present invention. In order to ultimately control, modify, and utilize any existing remanent magnetic state of the individual films or film members 12, and in order to modify, control, or determine the existing state of this remanent magnetization vector in certain individual elements 12 of the array, a pair of conductors, such as the transmission lines 14 and 15 are utilized. Upon passage of current therealong, these conductors generate magnetic flux that is inductively linked to certain of the individual ferromagnetic core members 12. Conductors of this type and arrangements thereof are well known in the art, and accordingly, do not constitute any portion of the present invention, other than that they are necessary in the ultimate operation and utilization of the individual ferromagnetic cores in the various film arrays.

Figure 1:
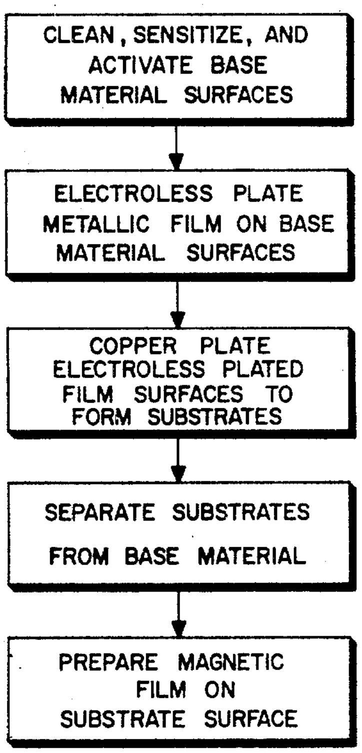
FIG. 1 is a flow chart illustrating particular steps that are carried out in practicing the improved ferromagnetic film preparation technique of the present invention.
Figure 2:
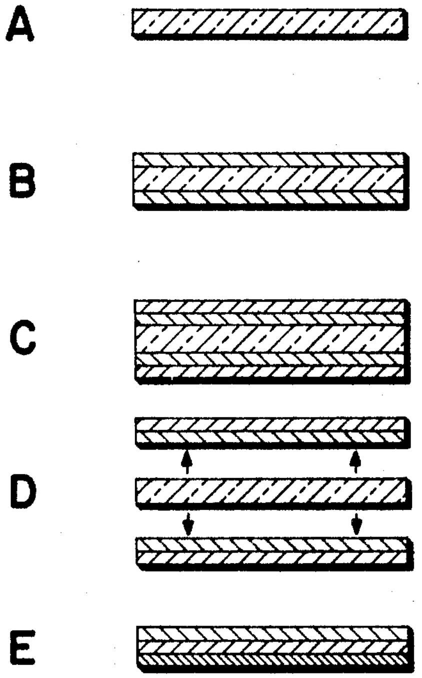
FIG. 2 is a sectional view illustrating the relationship of the substrate material to the glass surface during the various steps of the preparation technique shown in FIG. 1.

Particular attention is now directed to FIGS. 1 and 2 wherein the preferred technique is illustrated for the preparation of ferromagnetic core elements along the surface of substrates that have been prepared in accordance with the improved technique of the present invention. The substrate is prepared as an adhering layer, film, or the like upon the surface of a highly polished glass member, the finished substrate then being removed from the glass member and the glass replicated metallic surface thereof being utilized for receiving the ferromagnetic cores.

In preparing the surface of the glass body for receiving the substrate layer, the surface is initially polished to a high degree. In this regard, a paste prepared from a grit consisting essentially of precipitated calcium carbonate powder has been found to be particularly desirable. The polished surface is then coated with a thin metallic layer, such as an evaporative or electroless film of copper, which renders it possible to perform a succeeding electrolytic deposition of a mechanically sound backing layer of a metal such as copper or the like upon the initially applied film. When copper, which is the preferred material, is being utilized as the backing layer for the substrate, this material being deposited electrolytically, the initial evaporative metalizing film is preferably also copper. The electrolytic deposition of copper is continued until a film having a thickness of about 10 mils is achieved. For purposes of mechanical rigidity due to the required handling and other treatments of the substrates, a layer having a thickness of in excess of about 5 mils is normally required; however, it is even more desirable to have a film thickness of about 10 mils. After preparation, this substrate layer is peeled from the surface of the glass and then is prepared for receiving the ferromagnetic film elements thereon. It is generally desirable that the glass replicated surface of the substrate be protected from oxidation in order that best results may be achieved in preparing the finished ferromagnetic member on this surface. When either electrolytic or evaporative techniques are utilized to prepare the individual ferromagnetic films, suitable masking may be disposed over the appropriate surface area portions of the surface 13 of the substrate 11. After deposition of the appropriate ferromagnetic films, which may, for example, consist essentially of an alloy of nickel and iron, such as 81% nickel, balance iron, appropriate transmission lines are applied in inductive linking relationship to the individual films 12 in order to enable operation of the unit as a magnetic memory. A protective coating may then be applied to the system, if desired.

EXAMPLE 1

In preparing a ferromagnetic film array in accordance with the present invention, a smooth glass surface was cleaned utilizing a slurry of calcium carbonate and water, the slurry being in the form of a heavy paste. The outer surfaces of the glass plate were then sandblasted to a mild texture in order to enhance adhesion and retard peeling along these outer areas. The glass surface was then washed in a chromic acid solution, rinsed, and placed within an evacuated evaporative enclosure at a pressure of about $10^{-5}$ mm. Hg, a predetermined area of the glass including the textured areas being exposed to an evaporative source of substantially pure copper metal. A film having a thickness to function as a current conducting layer was evaporatively deposited on the glass, after which the placed unit was removed from the evacuated evaporating enclosure or chamber. The metalized area was then arranged cathodically in a copper plating bath at a current density of 30 amps./ft.$^2$, and an electrolytic layer of pure copper was then plated along the surface of the previously metalized layer until a uniform and sound layer having a substantially uniform thickness of 10 mils was prepared. The copper bath had the following composition:

| | Oz./gal. |
|---|---|
| $CuSO\cdot 5H_2O$ | 32 |
| $H_2SO_4$ | 8 |
| Molasses | 0.1 |

and was maintained at room temperature. The assembly was then removed from the copper plating bath, washed, and permitted to dry. The copper film forming the substrate was then stripped from the polished glass surface area, the specific surface which had been in contact with and bonded to the glass surface being utilized as a surface for receiving the ferromagnetic memory cores. Care must be taken to prevent formation of an oxide layer on the surface to receive the ferromagnetic films. The copper substrate member was then placed in a second evaporative coating chamber and an array of individual ferromagnetic cores having a composition of 81% nickel, balance iron was evaporatively coated onto the substrate surface. After completion of this operation, which was carried out in accordance with the techniques set forth in the aforementioned patent to S. M. Rubens, the system was then ready for application of transmission lines, in accordance with the specific manner indicated by the ultimate end use of the product.

EXAMPLE 2

A ferromagnetic film was prepared utilizing an electroless copper technique as distinguished from that set forth in Example 1. In this regard, a sensitizing solution having the following composition was used:

| | | |
|---|---|---|
| $SnCl_2\cdot 2H_2O$ | gm./l. | 70 |
| HCl (concentrated) | cc. | 40 |

The operation being carried out at room temperature for 4 minutes. An activator having the following composition was then utilized:

| | | |
|---|---|---|
| $PdCl_2 \cdot 2H_2O$ | gm./l. | 0.1 |
| HCl | cc./l. | 1 |

pH held at from 3.5 to 4.5.

The operation being carried out at a temperature of 110° F. for a period of 4 minutes. The area was then immersed in an electroless copper plating having the following composition:

| | | |
|---|---|---|
| $CuSO_4$ | gm./gal. | 66.5 |
| $K_2SO_4$ | gm./gal. | 8.0 |
| NaK tartrate | gm./gal. | 336.8 |
| NaOH | gm./gal. | 94.5 |
| Formaldehyde (37%) | ml./gal. | 25 |

The plating solution being held at 90° F. for a period of 4 minutes. The copper plated area was then arranged cathodically in the copper plating bath and plated in accordance with that electrolytic technique set forth in Example 1.

Each of the substrates was then ready for application of a magnetic film thereto.

For purposes of uniformity in preparation of individual film arrays, it may be generally desirable that the identical surface area of the glass be employed for receiving succeeding metallic substrate in a manner similar to the plating techniques set forth above. Accordingly, the glass unit or element is prepared for succeeding plating operations in accordance with the above.

While copper has been indicated as a preferred material for the initial metallic film, it will be appreciated that other materials may be utilized in lieu of the copper.

It will be appreciated that the specific examples given herein are for purposes of illustration only and are not to be otherwise construed as a limitation upon the scope to which this invention is otherwise reasonably entitled.

What is claimed is:

1. The method of fabricating a memory element comprising the steps of:
   (A) preparing at least one planar surface of a base member to form a very smooth surface;
   (B) forming a metallic substrate in bonded relationship upon the smooth surface;
   (C) separating the substrate from the base member to expose a replicated surface of the metallic substrate, said replicated surface corresponding to that surface in contact with the smooth surface of the base member before separation therefrom;
   (D) depositing ferromagnetic material upon the replicated surface to form discrete ferromagnetic elements thereon;
   (E) and disposing electrical conductor transmission lines in proximity to the ferromagnetic elements.

2. The method of claim 1 wherein:
   (A) the step of preparing the base member comprises polishing.

3. The method of claim 1 wherein:
   (A) the step of preparing the base member comprises polishing;
   (B) and the step of forming the metallic substrate comprises deposition.

4. The method of claim 1 wherein:
   (A) the step of preparing the base member comprises polishing;
   (B) the step of forming the metallic substrate comprises the deposition of copper;
   (C) and the step of depositing the ferromagnetic material comprises the deposition of a composition of nickel and iron.

5. The method of claim 1 wherein:
   (A) the step of forming the metallic substrate comprises:
      (1) vacuum depositing a metallic material upon the smooth surface;
      (2) electrolytically plating a backing layer of metallic material upon the vacuum deposited metallic material.

6. The method of claim 1 wherein:
   (A) the step of forming the substrate comprises successive electroless and electrolytic deposition of copper;
   (B) and the step of depositing ferromagnetic material comprises an electrolytic deposition of said ferromagnetic material.

References Cited

UNITED STATES PATENTS

| | | | |
|---|---|---|---|
| 2,433,441 | 12/1947 | Davidoff. | |
| 3,019,125 | 1/1962 | Eggenberger et al. | |
| 3,055,770 | 9/1962 | Sankuer et al. | |
| 3,098,803 | 7/1963 | Godycki et al. | |
| 3,102,048 | 8/1963 | Gran et al. | |
| 3,102,213 | 8/1963 | Bedson et al. | 29—625 X |
| 3,130,390 | 4/1964 | Moore et al. | |
| 3,210,742 | 10/1965 | Clow | 340—174 |
| 3,319,315 | 5/1967 | Dike | 29—604 |
| 2,171,599 | 9/1939 | Reid | 164—46 |
| 2,629,907 | 3/1953 | Hugger | 164—46 X |
| 2,135,873 | 11/1938 | Jones et al. | 204—6 |
| 2,792,340 | 5/1957 | James | 204—12 |
| 3,141,837 | 7/1964 | Edelman. | |
| 3,181,986 | 5/1965 | Pritikin | 29—423 X |
| 3,239,437 | 3/1966 | Stephen. | |
| 3,249,467 | 5/1966 | Stookey | 117—212 |
| 3,257,629 | 6/1966 | Kornreich. | |
| 2,335,774 | 11/1943 | Landry | 204—4 |
| 3,392,053 | 7/1968 | Olson et al. | 117—212 |

JOHN F. CAMPBELL, Primary Examiner

D. C. REILEY, Assistant Examiner

U.S. Cl. X.R.

29—527; 117—212; 204—4, 15